Figure 1:
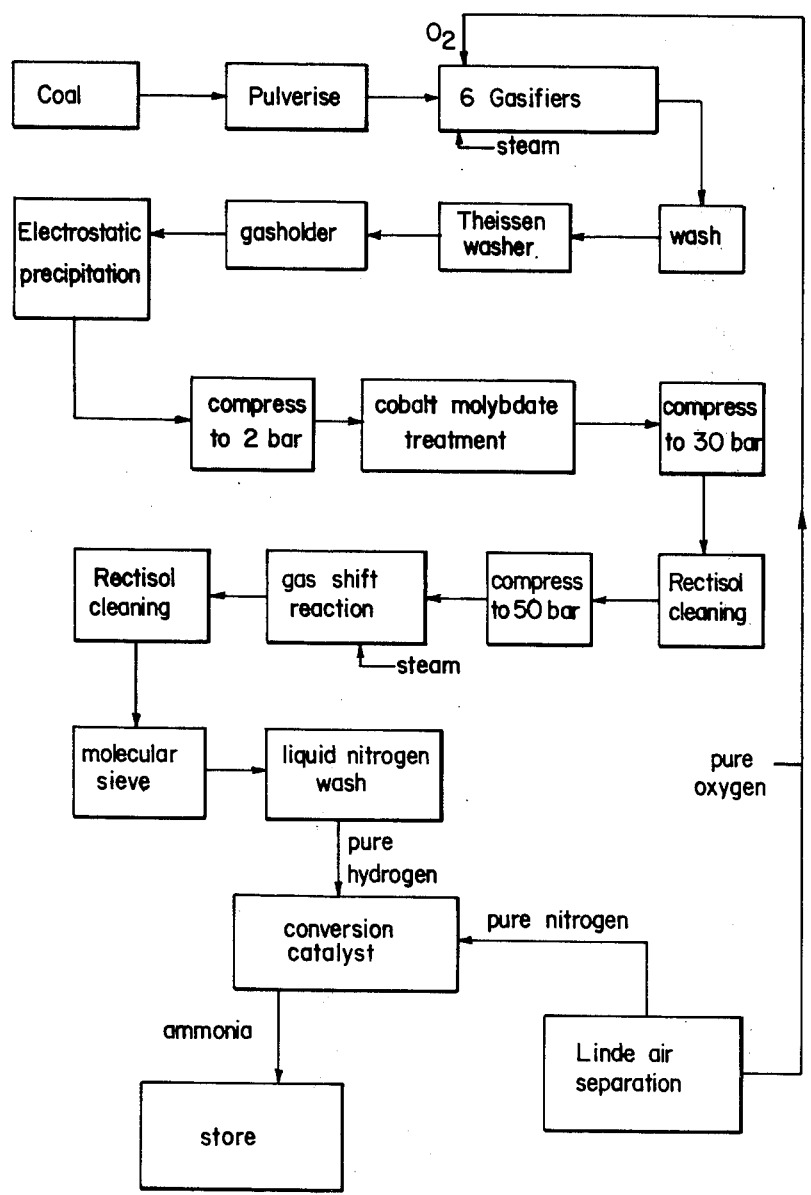

United States Patent [19]
Engelbrecht et al.

[11] 4,320,100
[45] Mar. 16, 1982

[54] PURIFICATION OF GAS MIXTURES

[75] Inventors: Andre D. Engelbrecht, Sandton; Gerardus J. van den Houten, Glen Randburg, both of South Africa

[73] Assignee: AECI Limited, Johannesburg, South Africa

[21] Appl. No.: 121,579

[22] Filed: Feb. 14, 1980

[30] Foreign Application Priority Data

Mar. 6, 1979 [ZA] South Africa ............... 79/1039

[51] Int. Cl.³ .................. B01D 53/36; C01B 3/02; C01C 1/04
[52] U.S. Cl. .................. 423/219; 423/239; 423/362; 423/648 A; 423/656; 55/73; 48/206
[58] Field of Search .......... 423/230, 219, 236, 239, 423/415 A, 648 A, 362, 656; 252/470; 48/206; 55/73

[56] References Cited

U.S. PATENT DOCUMENTS

| | | | |
|---|---|---|---|
| 3,393,979 | 1/1976 | Eisenlohr et al. | 423/239 |
| 4,041,130 | 8/1977 | Mackles | 423/220 |
| 4,175,928 | 11/1979 | Britton et al. | 48/197 R |
| 4,189,307 | 2/1980 | Marion | 48/197 R |

FOREIGN PATENT DOCUMENTS

| | | |
|---|---|---|
| 958496 | 1/1957 | Fed. Rep. of Germany . |
| 1007466 | 9/1958 | Fed. Rep. of Germany . |
| 1185158 | 1/1965 | Fed. Rep. of Germany . |
| 5127684 | 2/1974 | Japan ............... 423/239 |
| 851443 | 10/1960 | United Kingdom ........ 423/219 |
| 877680 | 1/1962 | United Kingdom ........ 423/239 |
| 1043563 | 9/1966 | United Kingdom ........ 423/230 |
| 1145032 | 3/1969 | United Kingdom ........ 423/230 |
| 2002809 | 2/1979 | United Kingdom ........ 423/236 |
| 2031016 | 4/1980 | United Kingdom . |

OTHER PUBLICATIONS

Grosskinsky, "Handbuch des Kokereiwesens," Karl Knapp Verlag, Dusseldorf, pp. 214-216.

*Primary Examiner*—Earl C. Thomas
*Attorney, Agent, or Firm*—Cushman, Darby & Cushman

[57] ABSTRACT

The invention concerns a process for the purification of a hydrogen-containing gas mixture comprising up to 45% by volume of hydrogen, together with carbon oxides, hydrogen cyanide and impurities including nitrogen oxides and/or oxygen. The process comprises passing the gas over a sulphur-resistant hydrogenation catalyst at a temperature of from 120° C. to 250° C. and at a pressure of from 0.5 to 250 bar to remove the nitrogen oxides and/or oxygen therefrom while substantially avoiding hydrogen cyanide removal. The gas may be obtained from a Koppers-Totzek gasifier and may be used for the production of ammonia after further purification. The sulphur-resistant catalyst may be a nickel molybdate or cobalt molybdate catalyst or a metal from Group VI and/or Group VIII of the Periodic Table.

11 Claims, 4 Drawing Figures

PURIFICATION OF GAS MIXTURES

This invention relates to the purification of gas mixtures.

We are aware that sulphur-resistant hydrogenation catalysts have been proposed for the purification of gases which contain a high content of hydrogen, that is to say, a content of 48% and above.

For example, in UK Patent Specification No. 851,443, coke oven gases obtained from the distillation of coal and having a hydrogen content of 52 to 55%, as well as containing $C_2$ and higher hydrocarbons in amounts of about 2 to 3% are hydrogenated over cobalt molybdate catalysts to remove oxygen, hydrogen cyanide and nitrogen oxides (hereinafter abbreviated to $NO_x$).

In UK Specification No. 1,145,032, cobalt molybdate catalysts are used to remove oxygen and carbon oxysulphide from partially combusted carbon-containing fuels having a hydrogen content of over 90%.

In UK Specification No. 2,002,809, synthesis gas from the partial oxidation of hydrocarbons or coal, and containing 40 to 62%, for example about 48%, of hydrogen is passed over a cobalt molybdate or nickel molybdate catalyst to remove hydrogen cyanide contained therein, from a starting level of up to 50 ppm to a final concentration of less than 1 ppm.

The Applicants are also aware, from UK Specifications Nos. 887,680 and 1,043,563, of the use of high temperatures (e.g. 300° to 450° C. or higher) for purifying gases.

The content of hydrogen in gas mixtures varies widely, depending on the origin of the gas. For example, a hydrogen and carbon monoxide-containing gas may be obtained, for example according to the process described in UK Patent Specification No. 780,120, by partial combustion of carbon-containing fuels, that is to say, a fuel containing free and/or chemically bound carbon, such as coke, coal, natural gas, crude petroleum and crude or refined petroleum fractions. Depending on the intended use for the gas, it may be desirable to remove certain impurities, while retaining other impurities. In the case of gases from Koppers-Totzek gasifiers, the hydrogen content is usually about 25 to 35% and it would be desirable to remove nitrogen oxides and/or oxygen from the gas at relatively low temperatures while not substantially reducing the hydrogen cyanide content. Other low hydrogen content cases for which similar purification would be desirable, are Texaco, Lurgi and Shell-Koppers gases, all of which generally have a hydrogen content of only about 30 to 40%.

The present invention provides a process for the purification of a hydrogen-containing gas mixture comprising up to 45% by volume of hydrogen on a dry basis, together with carbon oxides, at least 50 ppm of hydrogen cyanide and impurities including oxygen and/or at least one nitrogen oxide, which comprises passing the gas over a sulphur-resistant hydrogenation catalyst at a temperature in the range of from 120° to 250° C., and at a pressure of from 0.5 to 250 bar to remove the oxygen and/or at least one nitrogen oxide therefrom while retaining a hydrogen cyanide content of at least 50 ppm.

The gas may be passed through a catalyst bed at any suitable pressure in the above range, e.g. pressures of 1 to 40, especially 1 to 5 bar. The actual pressure used conveniently may be the pressure at which the gas leaves any previous purifying step in a system for producing the gas. We have also surprisingly found that low temperatures of under 250° C., for example about 140° to 200° C., usually 140° to about 155° C., give very good purification.

Although the process can be used for any suitable gas which contains one or more nitrogen oxides and/or oxygen as impurities, such impurities are present in hydrogen which is produced from coal and intended, e.g. for the manufacture of ammonia. The present invention is particularly applicable to the treatment of such gases. The hydrogen-containing gas may be produced by the so-called 'Koppers-Totzek' process (referred to in more detail below), or may be produced by the so-called Texaco, Lurgi or Shell-Koppers processes. The Koppers-Totzek process is a high temperature (1600° to 2500° C.) low pressure (0.8 to 1.1 bar) entrained flow process for the gasification of coal or other carbon-containing fuels. Reference may be had to 'Hydrocarbon Processing', April 1979, International Edition, page 153, published by Gulf Publishers.

The approximate operating temperatures and pressures for the gasification of carbon-containing substances for the four general processes referred to are set out below. The dry composition of Koppers-Totzek gas, and the approximate dry compositions of the major constituent of typical examples of Texaco, Lurgi and Shell-Koppers gases are also given in the following Table. The water vapour content may vary from zero to saturation at the operating temperature and pressure.

|  | Koppers-Totzek | Texaco | Lurgi | Shell-Koppers |
|---|---|---|---|---|
| Operating temperature range, °C. | 1600–2500 | 1350–1500 | 700–1200 | 1400–2000 |
| Operating pressure, bar | 0.8–1.1 | 18–30 | 30–100 | 30–40 |
| Dry gas comp. % v/v |  |  |  |  |
| CO | 58 | 46 | 19 | 66 |
| $H_2$ | 27 | 34 | 39 | 31 |
| $CO_2$ | 12 | 19 | 30 | 1.5 |
| $CH_4$ | 100 ppm | <0.1 | 11 | 0.4 |
| $H_2S$ | 0.5 | 0.3 |  | 0.4 |
| COS | 0.04 |  |  |  |
| $SO_2$ | 0.1 ppm |  |  |  |
| HCN | 100 ppm |  |  |  |
| $NO_x$ | 30–70 ppm |  |  |  |
| $NH_3$ | 15 ppm |  |  |  |
| $N_2$ | 0.9 | 0.6 | 1 |  |
| $A_r$ | 0.6 |  |  |  |
| $O_2$ | 100 ppm |  |  |  |

All gas contents referred to herein are calculated on a dry basis. If any hydrogen cyanide is decomposed, the residual content is at least 50 ppm. The gas to be treated conveniently contains under 40%, for example from about 25 to 40%, more usually 25 to 35%, by volume of hydrogen. Since a gas mixture produced by the Koppers-Totzek oxygen-gasification of coal is readily available to the Applicant, and since this gas mixture is ideally suitable for purification according to the invention and subsequent further treatment to produce ammonia, the overall process for producing ammonia from Koppers-Totzek gas will be described in greater detail. However, it is to be understood that other gas mixtures with a hydrogen content of from about 10 up to 45% by volume can be treated in the process of the invention.

In the Accompanying Drawings

Figure 2:
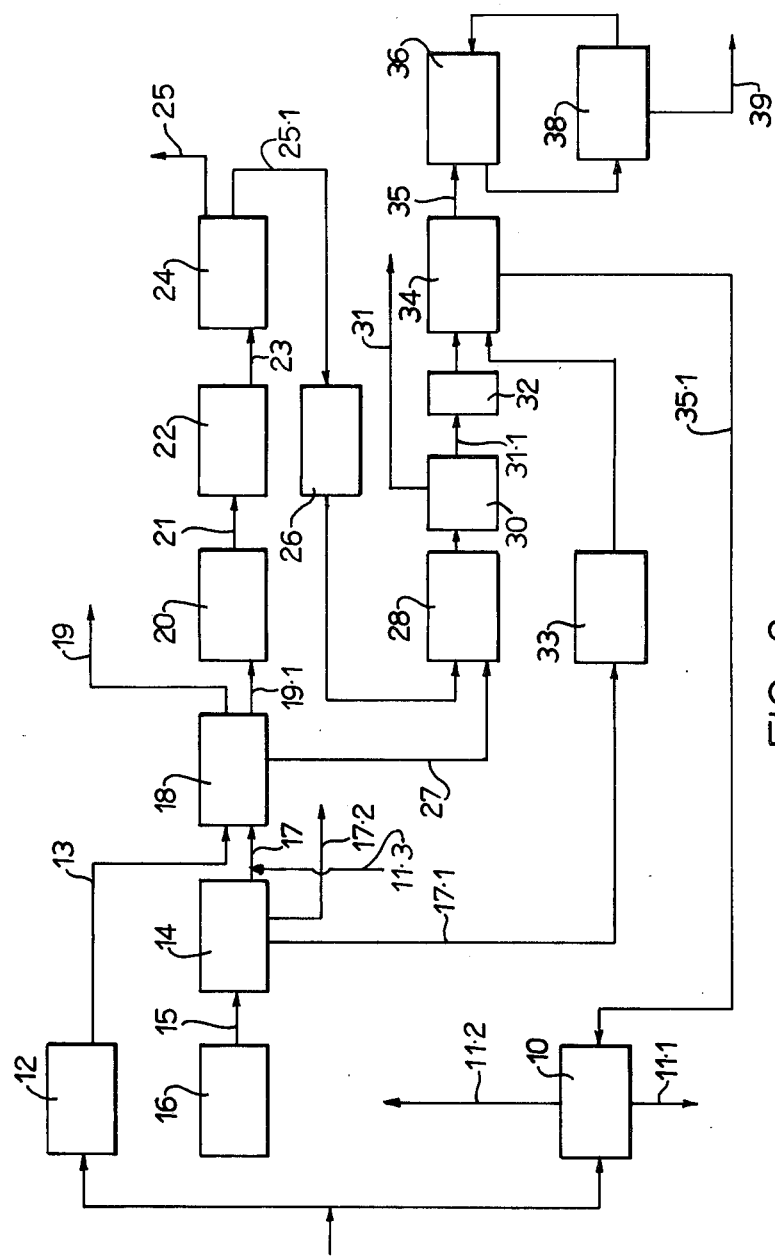
Figure 3:
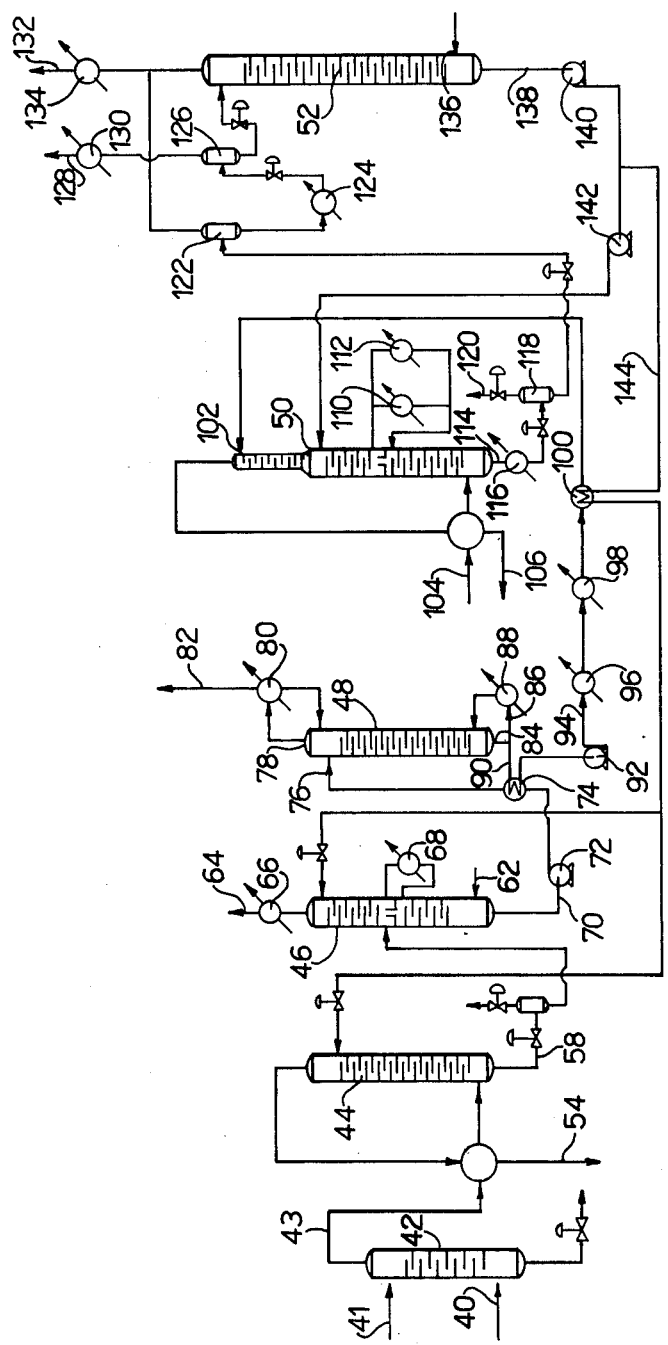
Figure 4:
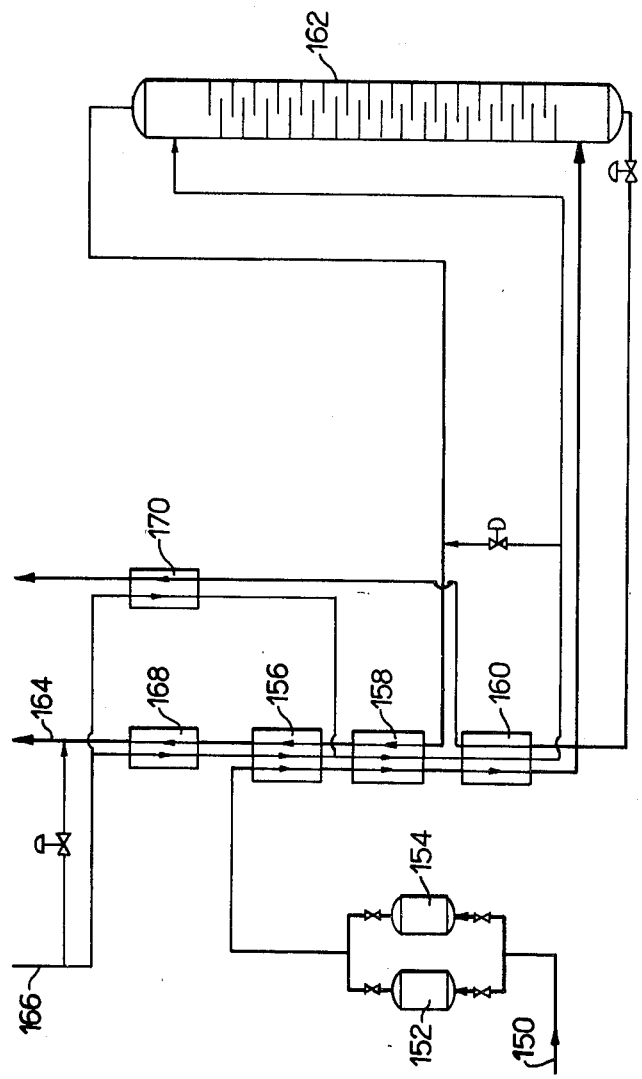

FIG. 1 is a schematic flow-sheet of a process for preparing ammonia, utilising the procedure of the present invention, and described below; and FIG. 2 shows schematically in block diagram form a coal based ammonia plant including a gas purification step according to the invention;

FIG. 3 shows detailed flowsheet of the Rectisol step which is items 24 and 30 in FIG. 2; and FIG. 4 shows in detail the nitrogen wash section represented by items 32 and 34 in FIG. 2.

Referring to FIG. 1, the procedure for producing ammonia from coal involves pulverising the coal to a fine dust with about 90% of the coal having a size less than 90 microns. This dust is conveyed in a stream of nitrogen to a plurality (generally about 6) Koppers-Totzek gasifiers. In these gasifiers, oxygen and steam are injected at low pressure (from about atmospheric pressure to about 50 millibar above) with the coal dust. Gasification occurs at high temperature (about 1600° to 2500° C., more usually at about 1700° to 2100° C. in the flame zone). The flame zone is the hottest part of the gasifier and the $NO_x$ is formed therein. The gas leaving the Koppers-Totzek gasifier is generally at a lower temperature of about 1500° to 1600° C. The Koppers-Totzek gasifier yields a substantially clean gas, which may have substantially the composition given in the table above. The nitrogen oxides ($NO_x$) are generally present as 5 to 500 ppm (more usually 30 to 150 ppm), and the oxygen generally is present as 5 to 200 ppm (more usually 100 to 150 ppm). The gas may contain ash but may be substantially free from tars and cresols. The nitrogen oxides may comprise nitrous oxide, nitric oxide or high oxidized nitrogen oxides (e.g. $N_2O_4$).

The gas from the Koppers-Totzek gasifiers preferably is first sprayed with water in spray towers to cool it and remove dust, followed by further dust removal such as in Theissen washers and separation in gas holders, thereafter followed by electrostatic precipitation to remove substantially all of the dust. The clean gas obtained by this stage is at a low pressure of about 30 m bar gauge and has substantially the same composition as the initial gas apart from the fact that most of the dust has been removed. The gas is saturated with water vapour at a temperature of about 30° C. and a pressure of about 0.85 bar.

The purification step of the invention conveniently can be carried out at this stage. The gas may first be brought to a pressure of about 2 bar. The gas can then be passed over a sulphur-resistant hydrogenation catalyst, which may comprise at least one transition metal from Group VI and/or VIII of the periodic table, generally in the form of an oxide and/or sulphide on a carrier, such as an inorganic refractory oxide. Group VI transition metals include chromium, molybdenum and tungsten. Group VIII transition metals include cobalt and nickel. The carrier may, for example, be MgO, $SiO_2$, $Al_2O_3$, $TiO_2$ and/or $ZrO_2$, a silicate, hydrated alumina, or the like. Particularly preferred catalysts are cobalt molybdate or nickel molybdate. A sulphur-resistant catalyst (e.g. a sulphided catalyst) is used as the gas still contains sulphur-containing impurities in the form of hydrogen sulphide, sulphur dioxide and/or carbonoxysulphide.

It has been found that passing the gas mixture through the catalyst at about 2 bar pressure, enables substantially complete removal of the nitrogen oxides and oxygen to be obtained without substantial removal of HCN present. Thus, the $NO_x$ content can be selectively reduced to below 0.01 ppm while retaining an HCN content of at least 50 ppm, thereby decreasing the deposition of sulphur in subsequent steps. For this stage the temperature is preferably 140° to 155° C., usually about 150° C. This is the approximate temperature at which the gas is conveniently delivered from dust removal and therefore no additional heating was necessary, thereby giving a saving in equipment and energy. Also, especially in the preferred temperature range, a shift conversion did not take place so that there was no sudden jump in temperature which would have involved further cooling.

The catalyst used preferably is a cobalt molybdate catalyst as a nickel molybdate catalyst can give rise to the formation of nickel carbonyls which are toxic. Such toxic gases would have to be removed if a nickel molybdate were used.

The gas from the purification step can then be compressed in four further stages to a pressure of from 25 to 35 bar, e.g. about 30 bar, and de-sulphurised in a 'Rectisol' cleaning process where substantially all of the hydrogen sulphide and carbonoxysulphide are removed to give contents of below 1 ppm. Thereafter, the gases can be pressurised to 50 bar and then a water gas shift reaction carried out in standard manner with the injection of steam (raised in boilers recovering heat elsewhere in the process) to convert the carbon monoxide to hydrogen and carbon dioxide. A conventional promoted iron oxide catalyst can be used. A particularly suitable catalyst has been found to be the catalyst known as ICI catalyst 15-4 which before use consists of 7 to 9% w/w $Cr_2O_3$, balance $Fe_2O_3$ and water of hydration. The gas obtained at this stage generally comprises about 55% hydrogen, the remainder being substantially carbon dioxide with about 3% of carbon monoxide, as well as small amounts of methane and argon.

The gas can be subjected to a further Rectisol step to remove the carbon oxides at temperatures of from about $-30°$ to $-50°$ C. Absorption can then take place to leave less than 10 ppm of carbon dioxide. The gas obtained will then contain over 95%, especially about 98% hydrogen, about 0.5% of methane, the rest being small amounts of carbon monoxide and traces of methane, argon and carbon dioxide. The carbon dioxide can be removed by adsorption on a molecular sieve.

Thereafter, cooling to about $-196°$ C. in a liquid nitrogen wash can remove substantially all of the remaining carbon monoxide, methane and argon. The liquid nitrogen can be obtained by a heat exchange system using nitrogen from a Linde air separation process. This can simultaneously produce substantially pure gaseous oxygen, (of about 98% purity) for the Koppers-Totzek gasifiers. The mixture of nitrogen and hydrogen from the wash is combined at about 220 bar and 200° to 500° C. over an iron oxide catalyst to give ammonia.

In the general process outlined above, it has been found that certain problems arise if the purification step of the invention is omitted. In particular sulphur and 'Roussin's salt' are formed in the Rectisol purification step during removal of hydrogen sulphide and carbonoxysulphide. The sulphur is a decomposition product of the Roussin's salt, and they both foul the surfaces of the apparatus and limit the heat transfer. They therefore limit the plant output. 'Roussin's salt', of formula $Fe_4S_3(NO)_7$, is a black sulphurous precipitate which is soluble in methanol and can dissociate when heated to form iron oxide. The sulphur and Roussin's salt also cause problems in the two-stage gas compression (ie first to about 30 bar and then to about 50 bar). However, the most serious disadvantage is the blocking of the liquid nitrogen wash unit with solidified nitrogen oxides. After a while, this causes the plant to be brought off-line due to the heat exchangers being blocked. The invention is therefore advantageous for removing the nitrogen oxide, at the stage described above, prior to the liquid nitrogen wash treatment, while at the same time avoiding or reducing the formation of sulphur and Roussin's salt.

Although the invention has been described particularly with reference to ammonia from coal production where a Rectisol (methanol washing) procedure and liquid nitrogen wash are involved, the invention can be used in the treatment of other gases which contain nitrogen oxides and oxygen as impurities.

A particularly preferred catalyst for the removal of oxygen and/or $NO_x$, is ICI's 41/6 cobalt molybdate catalyst which, before use, is an extruded composition of 4 weight % cobalt oxide, 12 weight % molybdenum oxide and hydrated alumina. The gas may be passed over this catalyst at a space velocity in the range of about 1000–15,000, preferably 2000 to 5000 (hour)$^{-1}$. After treatment, the content of nitrogen oxides was in the range of 0.01 to 0.05 ppm while that of oxygen was below the limit of detectability (less than 1 ppm). The catalyst used did not show any significant deterioration in performance after nine months of test use.

The following non-limiting Example illustrates the invention, and will be described with reference to FIGS. 2 to 4 of the accompanying drawings.

EXAMPLE

The steps in a coal-based ammonia plant are shown schematically in block diagram form in FIG. 2 of the accompanying drawings. Coal was supplied to two steam boilers 10 and two twin ring and ball type coal mills 12. The coal was pulverised in the mills 12 to a grist of 90% less than 90 μm. Electrostatic precipitators on the mills 12 reduced dust problems.

Ash was removed from the steam boilers 10 along line 11.1 while steam was supplied at 100 bar pressure along line 11.2 to turbines (not shown).

A single stream air separation plant 14, receiving air along line 15 from compressors 16 supplied oxygen at 98% purity along line 17 to six two-headed Koppers-Totzek gasifiers 18. Nitrogen from the air separation plant 14 passed to the nitrogen wash section described below along line 17.1 while by-product liquid oxygen was removed along line 17.2. The oxygen was premixed with steam from line 11.3 and the mixture entrained coal dust from screw feeders along line 13 into the gasifiers 18. The gasifiers 18 operated essentially at atmospheric pressure and a temperature of about 1600°–2500° C. A major part of the coal ash was entrained in the gas leaving the gasifiers 18, and was subsequently removed by scrubbing with water and passing through electrostatic precipitators (not shown). Ash was removed along line 19.

The gasifiers 18 had a 40 mm thick lining of refractory material upon which molten slag accumulated. A stable layer of frozen slag was permitted to form on the refractory material as a protective lining. Steel pins were resistance-welded into the gasifier wall and extended into the refractory for the dual purpose of supporting the refractory and enhancing heat conduction through the wall. The dry basis analysis of the raw gas produced in the gasifiers 18 was as follows:

CO: 58%
$H_2$: 27%
$CO_2$: 12%
$CH_4$: 100 ppm
$H_2S$: 0.5%
COS: 0.04%
$SO_2$: 0.1 ppm
HCN: 100 ppm
$NO_x$: 30 to 70 ppm
$NH_3$: 15 ppm
$N_2$: 0.9%
Ar: 150 ppm
Ash Dust: 0.1 mg/$Nm^3$.

This gas passed along line 19.1 into a cobalt molybdate treatment step 20 after being compressed (not shown) to a pressure of 2 bar. The above mentioned ICI cobalt molybdate catalyst (41/6) was employed. The gas temperature was 150° C. In this step, the oxygen and $NO_x$ were substantially removed without substantial removal of the HCN. The thus-treated gas passed along line 21 to compressors 22.

The gas was compressed to 30 bar in three further stages of twin-stream raw gas compressors 22. It then passed alone line 23 to be desulphurised in a Rectisol step 24.

This step is shown in greater detail in FIG. 3 of the accompanying drawings, and further described below. The process involves desulphurisation to less than 1 ppm $H_2S$ and COS in a methanol scrubbing column at about −38° C. Sulphur compounds absorbed from the gas ($H_2S$ and COS) were removed from the circulating methanol stream in a stripping column and produced a by-product stream containing about 60% $H_2S$ and COS alone line 25. The substantially sulphur-free gas passed along line 25.1 to two gas compressors 26.

A final stage of compression with the compressors 26 raised the gas pressure to 50 bar after which it was subjected to a water-gas shift reaction in twin-stream converter units 28 with a conventional promoted iron oxide catalyst. Steam for the shift reaction was supplied along line 27 from waste-heat boilers on the gasifiers 18. The carbon monoxide and steam were converted to carbon dioxide and hydrogen in the converter units 28 and the residual (dry basis) CO content was about 3% v/v.

Carbon dioxide was removed (to less than 10 ppm) from the gas by absorption in methanol at about −58° C. in a Rectisol $CO_2$ removal step 30. Through line 31 $CO_2$ was recovered from the methanol in a Rectisol $CO_2$ removal step 30 and a proportion thereof was used in urea manufacture on another plant. The purified hydrogen-containing gas was passed along line 31.1 through molecular sieves 32.

The final traces of $CO_2$ were removed by adsorption in the molecular sieves 32 and the gas then passed to a column 34 for scrubbing with liquid nitrogen at −190° C. This resulted in an ammonia synthesis gas in line 35 of high purity, such that no voluntary purge of the synthesis loop was required to avoid build-up of inert gases. Nitrogen from the air separator 14 was compressed at 33 and passed into the nitrogen wash column 34. The pure hydrogen and nitrogen were passed along line 35 to a compressor 36. Recovered gas from the nitrogen wash 34 was passed along line 35.1 to the steam boilers 10.

A conventional ammonia synthesis loop 38 operating at 220 bar, was employed. Liquid ammonia was recovered along line 39.

The Rectisol process of units 24 and 30 is shown in more detail in FIG. 3.

Raw gas 40 from compressors 22 at 30 bar pressure was scrubbed with water from line 41 in HCN absorption tower 42. The resulting gas passing alone line 43 was desulphurised by scrubbing with $CO_2$-laden but sulphur-free methanol in $H_2S$ absorber tower 44. In addition to the HCN absorber tower 42 and $H_2S$ absorber tower 44, the other towers shown are an $H_2S$ rewash tower 46, an $H_2S$ stripper tower 48, a $CO_2$ absorber tower 50 and a $CO_2$ stripper tower 52.

The gas from the tower 42 passed along line 43. The gas, leaving along line 54, had a combined $H_2S$ and COS content of less than 1 ppm, whereas the raw gas had a combined $H_2S$ and COS of about 0.54% by volume.

The bottom outlet for methanol from the $H_2S$ absorber 44 passed along line 58 to the $H_2S$ rewash tower 46 where sulphur-rich methanol was stripped with nitrogen to remove $CO_2$.

Stripping nitrogen entered the $H_2S$ rewash tower 46 at 62 and waste gas was vented at 64 after cold recovery at 66. A further cold recovery took place at 68. Line 70 from the bottom of the tower 46 passed through pump 72 and heat exchanger 74 to enter the $H_2S$ stripper at 76. The upper outlet 78 led through a water cooler 80 to line 82 for $H_2S$, COS and $CO_2$ by-product containing 60% $H_2S$ and COS.

The bottom outlet 84 from the $H_2S$ stripper tower 48 led along line 86 through a steam heater 88 back to the tower 48. Line 90 led through the heat exchanger 74 to another pump 92. Line 94 from the pump 92 passed through cold input 96, ammonia chiller 98, and heat exchanger 100 to enter the $CO_2$ absorber tower 50 at 102 at a temperature of $-58°$ C.

Gas in line 104 from CO shift conversion 28 was subjected to a two-stage wash in a $CO_2$ absorber 50. The first wash was with methanol from the $CO_2$ stripper 52, and the second with regenerated methanol from the $H_2S$ stripper 48. The purified gas passed along line 106 and contained up to 10 ppm $CO_2$. It then passed to the nitrogen wash 34.

Part-way down the $CO_2$ absorber 50 is a cooling line involving an ammonia step 110 and a cold input 112. Bottom outlet 114 from the base of the $CO_2$ absorber 50 led through heat exchanger 116 to flash vessel 118 where some gas was vented through 120 for recycling while the remainder passed into flash vessel 122 and then through heat exchanger 124 into the $CO_2$ stripper 52 flash vessel 126.

$CO_2$ for urea production was removed at 128 following a cold recovery treatment at 130. Waste gas was vented to the atmosphere at 132 following a cold recovery treatment at 134.

Stripping nitrogen entered the $CO_2$ stripper at 136. The bottom outlet 138 from the $CO_2$ stripper 136 led through pump 140 to pump 142 and the $CO_2$ absorber 50 as well as along line 144 to the heat exchanger 100. From the heat exchanger 100, line 146 led to the $H_2S$ rewash tower 46 and to the $H_2S$ absorber 44, entering the latter at $-38°$ C.

Deposits of sulphur in the Rectisol heat exchangers had previously occurred and had sometimes resulted in restricted methanol circulation rates. Physical fouling of the heat exchangers had previously resulted in insufficient cooling of methanol to give the required carbon dioxide and hydrogen sulphide absorption. These problems no longer arose when the process of the present invention was carried out.

Referring to the nitrogen wash (see FIG. 4 of the accompanying drawings) gas 150 from the Rectisol unit 30 (see FIG. 2) passes to $CO_2$ adsorbers 152, 154 and then to heat exchangers 156, 158, 160 before passing to a nitrogen wash column 162 and back through the heat exchangers 156, 158 and 160 to emerge as synthesis gas in line 164 which passes to the compressor 36 (of FIG. 2).

Cold nitrogen is introduced along line 166 to pass through the heat exchangers 156, 158 and 160, as well as through further heat exchangers 168 and 170, and the nitrogen wash column 162.

Before application of this invention, blockage of heat exchangers 156, 158 and 160 with solid nitrogen oxide deposits occurred at frequent intervals, necessitating shutting down of the plant to remove the deposits. These blockages no longer occurred.

We claim:

1. A process for the purification of a hydrogen-containing raw synthesis gas mixture which comprises 10% to 45% by volume of hydrogen on a dry basis, together with carbon oxides, at least 50 ppm hydrogen cyanide and impurities including at least one gas selected from a nitrogen oxide and oxygen and at least one sulphur-containing gas, and which is substantially free of hydrocarbons other than methane, said process comprising passing the gas mixture over a sulphur-resistant hydrogenation catalyst at a temperature of from 120° to 250° C. and at a pressure of from 0.5 to 250 bar to remove at least one gas selected from nitrogen oxides and oxygen therefrom while retaining a hydrogen cyanide content of at least 50 ppm.

2. A process according to claim 1, wherein the catalyst is a cobalt molybdate catalyst, and wherein the gas mixture is passed over it at a temperature of from 140° to 200° C. and a pressure of up to 5 bar.

3. A process according to claim 2, wherein the gas mixture has a content, by volume, of about 58% of carbon monoxide, about 12% of carbon dioxide, and about 27% of hydrogen, the remainder being hydrogen cyanide and impurities comprising hydrogen sulphide, carbonoxysulphide, methane, nitrogen oxides and oxygen.

4. A process as in claim 1 comprising the further steps of removing sulphur-containing gas from the resultant gas mixture; reacting the gas mixture with steam to convert carbon monoxide to hydrogen; removing further impurities therefrom to yield a gas having a hydrogen content of over 95% by volume; and reacting this gas with nitrogen in the presence of an ammonia synthesis catalyst.

5. A process as in claim 4 comprising the further step of adding nitrogen to the gas having a hydrogen content of over 95% by volume, reacting the resulting mixture in the presence of an ammonia synthesis catalyst and recovering ammonia from the reacted gas.

6. In a process for producing purified hydrogen by the steps of
   (a) oxygen-gasification of coal to produce a raw gas containing carbon monoxide, under 45% by volume of hydrogen and impurities including sulphur compounds, at least 50 ppm of hydrogen cyanide and at least one impurity selected from oxygen and nitrogen oxides, but substantially free of unsaturated hydrocarbons;
(b) removal of sulphur compounds by washing with cold methanol;
(c) catalytic shift conversion of carbon monoxide with steam to produce carbon dioxide and additional hydrogen;
(d) removal of carbon dioxide by washing with cold methanol; and
(e) removal of residual impurities by washing with liquid nitrogen;

the improvement resulting in a decreased tendency to form deposits in step (b), (d) or (e) which comprises removing at least one impurity selected from oxygen and nitrogen oxides from the raw gas by passing that gas at a temperature in the range 120° to 250° C. and a pressure in the range 0.5 to 250 bar before step (b) over a sulphur-resistant hydrogenation catalyst and controlling the conditions so that at least 50 ppm of hydrogen is retained in the gas so treated.

7. A process according to claim 1 in which the catalyst comprises, in oxide and/or sulphide form, at least one transition metal selected from the metals of Groups VI and VIII of the Periodic Table, and an inorganic refractory oxide carrier.

8. A process as in claim 7 in which the catalyst is cobalt molybdate or nickel molybdate on an alumina carrier.

9. A process according to claim 1 in which the hydrogen content of the starting gas is in the range 25–35% by volume.

10. A process according to claim 1 in which the temperature is in the range 140°–155° C.

11. A process according to claim in which the starting gas is the product of gasifying coal with oxygen at a temperature in the range 1600°–2500° C. and a pressure in the range 0.8 to 1.1 bar.

* * * * *